(12) United States Patent
Bakshiram et al.

(10) Patent No.: US 10,627,251 B2
(45) Date of Patent: Apr. 21, 2020

(54) METHOD AND SYSTEM FOR FACILITATING TRAVEL

(71) Applicant: MASTERCARD INTERNATIONAL INCORPORATED, Purchase, NY (US)

(72) Inventors: Sharan Bakshiram, Purchase, NY (US); Amit Singh, Lucknow (IN); Sheetanshu D. Gupta, Rajasthan (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 338 days.

(21) Appl. No.: 15/601,089

(22) Filed: May 22, 2017

(65) Prior Publication Data

US 2017/0336223 A1 Nov. 23, 2017

(30) Foreign Application Priority Data

May 20, 2016 (SG) .............................. 10201604053S

(51) Int. Cl.
| | |
|---|---|
| *G06Q 40/00* | (2012.01) |
| *G01C 21/36* | (2006.01) |
| *G06Q 30/06* | (2012.01) |
| *G06Q 20/32* | (2012.01) |
| *G06Q 20/22* | (2012.01) |
| *G06Q 20/28* | (2012.01) |

(52) U.S. Cl.
CPC ..... *G01C 21/3679* (2013.01); *G01C 21/3617* (2013.01); *G06Q 20/22* (2013.01); *G06Q 20/28* (2013.01); *G06Q 20/3224* (2013.01); *G06Q 30/0631* (2013.01)

(58) Field of Classification Search
USPC ......................................................... 705/5, 6
See application file for complete search history.

(56) References Cited

U.S. PATENT DOCUMENTS

| | | | | |
|---|---|---|---|---|
| 2007/0073562 A1* | 3/2007 | Brice | ..................... | G06Q 10/02 705/5 |
| 2012/0179671 A1* | 7/2012 | Turner | ..................... | G06F 16/95 707/723 |
| 2012/0191492 A1* | 7/2012 | Diba | ..................... | G06Q 10/025 705/6 |
| 2013/0218615 A1* | 8/2013 | Fredericks | ............. | G06Q 40/10 705/6 |
| 2015/0286960 A1* | 10/2015 | Habibi | ................... | G06Q 10/02 705/5 |
| 2016/0086222 A1* | 3/2016 | Kurapati | ............ | G06Q 30/0204 705/14.53 |
| 2016/0307214 A1* | 10/2016 | Fralick | ............... | G06Q 30/0201 |
| 2017/0193550 A1* | 7/2017 | Misra | ................. | G06Q 30/0255 |

* cited by examiner

*Primary Examiner* — Masud Ahmed
(74) *Attorney, Agent, or Firm* — Budzyn IP Law, LLC

(57) ABSTRACT

A computer-implemented method and computer system are proposed which suggest a multi-destination travel itinerary to a user, who is typically a payment card holder. The itinerary is generated using information about earlier multi-destination journeys made by the user and other payment card holders, as identified based on payment transaction data relating to payment transactions made by the card holders. The other payment card holders may be ones having payment transaction characteristics similar to the user, and the suggested travel itinerary may be selected to have properties consistent with previous journeys the user has made.

23 Claims, 5 Drawing Sheets

METHOD AND SYSTEM FOR FACILITATING TRAVEL

SUMMARY OF THE INVENTION

The present invention relates to methods and systems for suggesting travel options to a user.

BACKGROUND OF THE INVENTION

Consumers spend a considerable portion of their income on vacation travel. A certain proportion of consumers prefer to take this travel in destinations with which they are not already familiar. Accordingly consumers have to spend considerable time on planning, with the risk that the travel will be ruined by a poor choice of destination, or of product providers in those destinations. The term "product" in this document is used to include both goods and services, and the term "product provider" (or equivalently "merchant") is thus used to include an individual or organization which operates one or more hotels, restaurants, shops, vehicle hire companies, etc. The term "hotel" is used in this document to describe any place which offers lodging (in particular, temporary lodging) to visitors on a paid basis, and thus includes not only conventional hotels but also guest houses, serviced apartments, and even rented rooms. The term "destination" is used to mean a geographical region, such as a town, or a county, or a predefined section of a town or county. Typically a destination is large enough to include a plurality of hotels.

Although there is endless information about travel destinations available on internet, much of it is unreliable. For example, the websites of hotels typically provide carefully selected images which are not typical of the experience of a traveler staying in the hotel. Social media websites such as Tripadvisor.com contain reviews written by people who allege that they have stayed at the hotel, but in some cases these reviews are actually written by individuals who are not genuine travelers, such as individuals associated with the hotel (or with the hotel's competitors), and the reviews contain biased information. Even if the reviews are by genuine travelers, those travelers may be untypical (e.g. only those travelers who have had a bad experience, or only travelers from a certain demographic). Furthermore, a small hotel may not be reviewed at all, or very rarely, so any reviews available for it may be old and give out of date information. For these reasons, it is hard to rely on the information available online.

Furthermore, the needs of travelers differ according to the type of travel they are taking. Some travelers, especially ones accompanied by young children, prefer to spend the entire vacation at a single location. Other travelers prefer take a vacation which is a journey including multiple travel destinations (a "road trip"). The term "travel destination" is used to mean a geographical location of the kind which is conventionally marked in a travel atlas, such as a city, or a region of a country. The travel destinations are not locations with which the traveler has a long-term association, in other words locations where the traveler habitually spends time (e.g. where the traveler resides or which he or she habitually visits). Often the travel destinations of a road trip are spaced apart pairwise by a relatively short distance (such as no more than 300 km, no more than 200 km or even no more than 100 km). Typically, the travelers stay for a short time (perhaps just one night, or a small number of nights) in each travel destination, and travel (typically by ground-based transport such as a car, train or bus) between them. Such travelers may prefer to use hotels which are well-located for transport networks, so the travelers rate that hotel characteristic more highly than, for example, whether the hotel provides childcare for young children.

There is a need to assist consumers with selection of travel destinations and with product providers in those travel destinations.

SUMMARY OF THE INVENTION

The present invention aims to provide new and useful methods and systems for suggesting travel destinations to users, and/or suggesting product providers in those destinations.

In general terms, the invention proposes a computer-implemented method and computer system which suggest to a user, who is typically a payment card holder (a "card holder"), a travel itinerary comprising multiple travel destinations (a "multi-destination" itinerary). The itinerary is generated using information about earlier multi-destination journeys made by other card holders, as estimated based on payment transaction data relating to payment transactions made by the other card holders. The term "earlier journey" means a journey carried out prior to the time at which the method is carried out by the computer system.

The other card holders are preferably ones who according to transactional data, have payment habits which are similar to the user, according to one more criteria describing their respective payment transactions. For example, the card holders (i.e. the user and the other card holders) may be classified into a number of classes using the one or more criteria, and itinerary suggestions for the user may be made based on earlier multi-destination journeys made by the other card holders in the same class. Thus, the user is provided with a proposed multi-destination travel itinerary based on the previous travel choices of individuals similar to him- or herself.

The method may include identifying one or more earlier journeys of the user (particularly multi-destination journeys) using transaction data relating to payment card purchases by the user, and identifying the user's tastes based on characteristics of the user's earlier journeys. The suggested travel itinerary may be selected to have properties consistent with these tastes and/or constraints. These tastes, and/or other constraints selected by the user, may be used to filter the identified journeys by the other card holders, so that identified journeys which are not in conformity to those tastes and/or constraints are not used in the process for suggesting an itinerary to the user, or are given a lower weighting in that process.

In one case, the identification of the earlier multi-destination journeys (by the user and/or the other card holders) may be carried out using addendum data in the transaction data specifying the products which were purchased. For example, it is common to include addendum data in transaction data relating to payment card purchases of hotels, flights and vehicle rental, and this addendum data may be used to infer that the cardholder has made a journey.

Additionally or alternatively, the earlier multi-destination journey may be identified by noting successive payments made by the card-holder during a certain period in different respective destinations, such as destinations which are spaced apart by a distance in a certain distance range.

If a given cardholder has a long-term association with one or more locations (e.g. the cardholder's registered address, or a location where the cardholder makes purchases habitually), then the transaction data relating to transactions to vendors associated with those location(s) may be excluded from the transaction data used to identify the earlier journeys.

For example, the system may identify if a certain card holder has purchased hotel rooms in successive travel destinations (which are not locations with which the user/cardholder has a long term association) on successive dates during a short period. If so, it is likely that the cardholder has carried out a journey to those travel destinations. This likelihood is increased if the system identifies that the cardholder has made a payments transaction to rent a vehicle proximate to one of those locations, or has purchased travel tickets to a first of the travel destinations or from a last of the travel destinations.

Once a set of earlier journeys of other cardholders has been estimated (that is, typically, journeys for other card holders in same class as the user and filtered based on the user's tastes and/or user-specified constraints), the computer system may perform a pattern recognition algorithm to identify regularities in the set of earlier journeys. The regularities may be destinations which occur with a relatively high statistical significance.

Of course, sometimes the computer system will incorrectly estimate that a certain card holder has performed an itinerary (e.g. if a cardholder books an itinerary for a friend). However, such errors are mere noise, and therefore should have no influence on the regularities recognized by the itinerary suggestion component.

The generated itinerary may include at least one date suggestion, for example in form of a suggested range of dates. The date suggestion may be derived using data characterizing times when the other card holders (particularly other card holders in the same class as the user) visited the destination.

The date suggestion may further be based at least partly on data characterizing identified earlier journeys by the user, especially multi-location journeys. For example, the data may for example, comprise user data indicating the time of year when the user made the identified earlier journey, and/or the weather at the corresponding destinations at the time.

The date suggestion may at least party be based on destination data characterizing the travel destination at corresponding times. For example, this may include destination data characterizing expected weather conditions at the destination at corresponding times of the year. Since a road trip is more pleasant in warm weather, the system may only suggest destination dates for which the destination data indicates that the weather in the destination meets a certain criterion (e.g. the destination data shows that the typical temperature in the destination is above a certain value). Optionally, the date suggestion may be such that the expected weather conditions at one or more of the travel destinations of the itinerary match expected weather conditions when the user has previously traveled.

The destination data may further comprise data describing scheduled events (e.g. music festivals).

In another example, the destination data characterizing the destination at corresponding times may include data characterizing the variation of prices at the destination at corresponding times, such as times of the year or times of organized events.

Alternatively or additionally, one of the constraints set by the user may be a date constraint (either in the form of specific dates, or a range of dates, when the user wishes to travel), and the itinerary and/or date suggestion may be generated based on the date constraint. In this case too, the itinerary and/or data suggestion may additionally be made using the destination data. For example, the system may only suggest an itinerary consisting of locations where the destination data indicates that the weather meets a predefined criterion (e.g. the temperature is above a certain average value), during at least some dates meeting the data constraint.

Additionally, the computer system may suggest product providers, or specific products, to the user relevant to the suggested at least one itinerary. Conveniently, this may be done by providing hyperlinks within a graphical user interface (GUI) controlled by the computer system, e.g. displayed on a screen of a communication device associated with the user.

In one possibility, these product providers or products may be suggested based on products purchased by the other card-holders at the destinations of the suggested itinerary. This may for example be at least partly determined using the addendum data (if any) in the transaction data for purchases relating to travel to the destination or at the destination.

The product providers or products may include travel tickets (e.g. flight tickets) to a location proximate the start of the itinerary and/or from a location proximate an end destination of the itinerary. They may further include a vehicle rental company, and/or a specific rental vehicle type. They may further include hotels at one of the destinations of the itinerary.

In summary, preferred embodiments of the invention act as a travel guide for a cardholder interested in going on a road trip by making recommendations for food, stay, flights, vehicle, and most importantly the route to follow, taking into account the expected weather. All these recommendations are based on preferences of the cardholder which are identified using transaction data, so that cardholder can avoid an irritating web search to make all the arrangements.

As used in this application, the term "payment card" refers to any cashless payment device associated with a payment account, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, transponder devices, NFC-enabled devices, and/or computers. Furthermore, the "payment card" may exist only as a data structure (i.e. without physical existence), which is registered with a digital wallet or cloud wallet.

Furthermore, as used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable medium embedded with a computer executable program, which encompasses a computer program accessible from any computer-readable storage device or storage media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

BRIEF DESCRIPTION OF THE FIGURES

An embodiment of the invention will now be described with reference to the following drawings in which.

DETAILED DESCRIPTION OF THE EMBODIMENT

Figure 1:
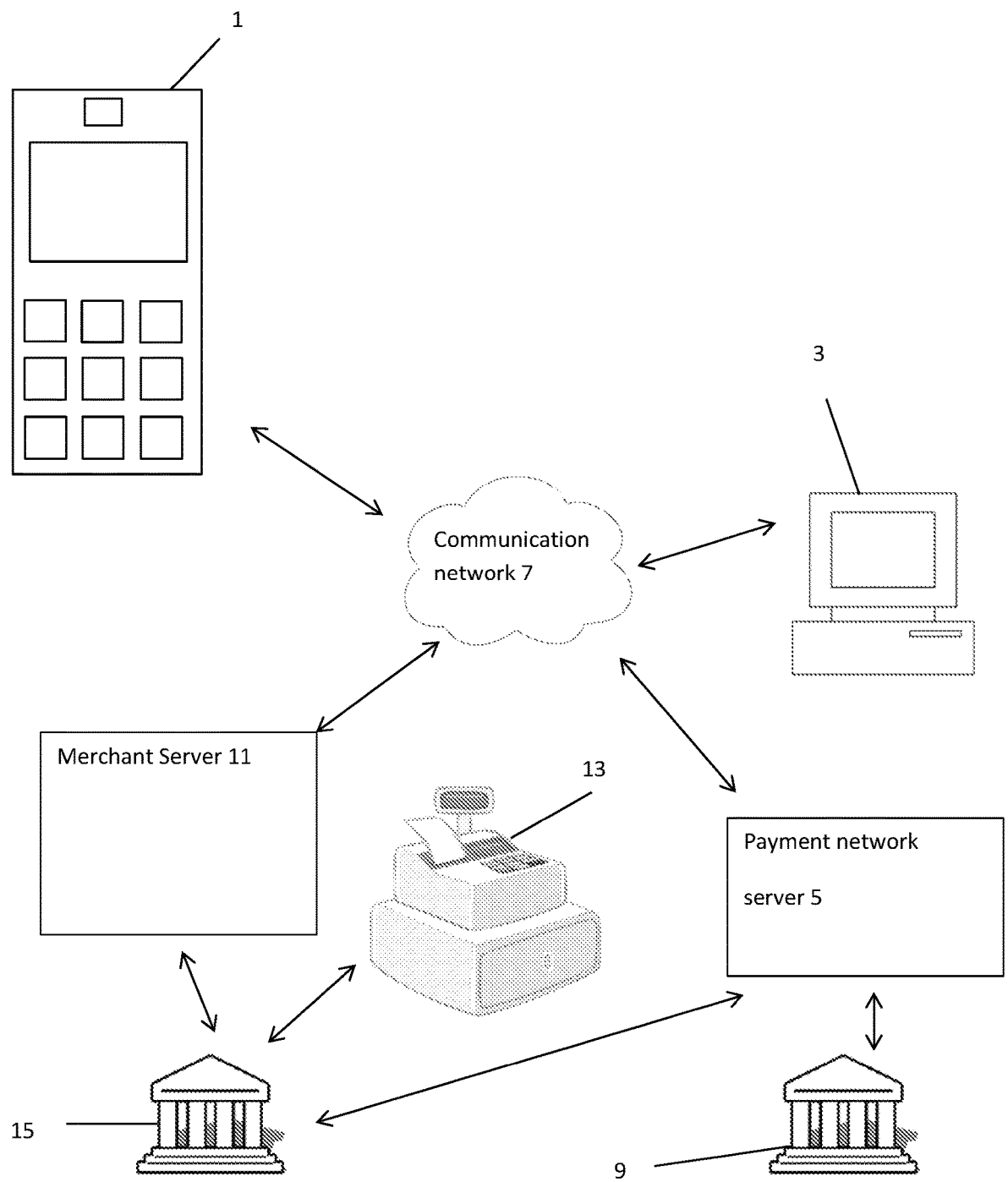
FIG. 1 shows a computerized network which can perform a method which is an embodiment of the invention.

Referring firstly to FIG. 1, a computerized network is shown which is an embodiment of the invention. The structure includes one or more communication devices 1, 3 which a certain card holder (typically an individual) can use to communicate with a server 5 over a communication network 7, which may be the internet. The communication device 1 is a mobile communication device such as a tablet or smartphone. The communication device 3 is a personal computer (PC). Any given card holder may have either of both of these devices.

Although the communication device(s) 1, 3 of only a single card holder are shown in FIG. 1, more typically the communication network will include a large number of card holders, each associated with one or more communication devices. For simplicity, however, only a single card holder will be described in the following description of FIG. 1.

The card holder is assumed to be a cardholder, carrying at least one payment card issued by an issuing bank, having an issuing bank server 9. The payment card is part of a payment network coordinated by the server 5, which is designated a payment network server, having the structure shown in FIG. 2.

The system by which a card holder uses the payment card to make a purchase from a merchant is as in a conventional system. In a first case, the card holder uses one of the communication devices 1, 3 to access an online store supported by a merchant server 11 operated by the merchant to select products for purchase, and subsequently supplies details of the payment card to the merchant server 11. In a second case, the card holder presents products for purchase to a point-of-sale (POS) terminal 13 located at premises operated by the merchant. Optionally, the POS terminal may interact with the card holder's mobile communication device 1, or the card holder may present a physical payment card to the POS terminal. In either case, the merchant server 11 or POS terminal 13 sends details of the payment card to an acquiring bank server 15 operated by an acquiring bank at which the merchant maintains an account. The acquiring bank server 15 submits a payment request to the payment network server 5 including transaction data describing the proposed purchase. This transaction data typically includes data specifying the identity of the merchant and the payment amount. It may further include addendum data describing the product(s) to be purchased. The payment network server 5 sends a payment authorization request to the issuing bank server 9. The issuing bank server 9 issues a message to the payment network server 5 indicating whether the payment is authorized. The payment network server 5 relays the message to the merchant server 11 or the POS terminal 13. If the issuing bank server authorized the payment, then the payment now proceeds. The issuing bank debits the payment amount (optionally plus a handling charge) to the payment account associated with the card holder. The acquiring bank server 15 credits the payment amount (optionally minus a handling charge) to the payment account of the merchant. The issuing bank transmits the payment amount (optionally less a handling charge) to the acquiring bank. Typically, this final step is done later during a clearing operation.

The above scheme has a number of known variations which may be incorporated in the embodiment: for example, the payment card may be associated with a digital wallet maintained by a digital wallet server. The digital wallet server may be the payment network server 5, or another server such as the issuer bank server 9 (or one which is not shown in FIG. 1). If so then, in the case of the card holder making a purchase from the merchant server 11, the card holder does not enter the payment card data directly into the merchant server 11, the card holder may direct the merchant server 11 to obtain the payment card data (optionally in tokenized form) from the digital wallet. Similarly in the case of the card holder making a purchase from the POS terminal 13, the card holder's communication mobile device 1 communicates with the POS terminal 13 and the digital wallet server to obtain payment card data (optionally in tokenized form) from the digital wallet server, and provide it to the POS terminal 13. The rest of the payment procedure may then be the same as described above.

In contrast to a conventional computerized network, in the embodiment of FIG. 1 the cardholder is able to communicate with the payment network server 5 using the communication devices 1, 3 over the communication network 7 to obtain travel recommendations.

Figure 2:
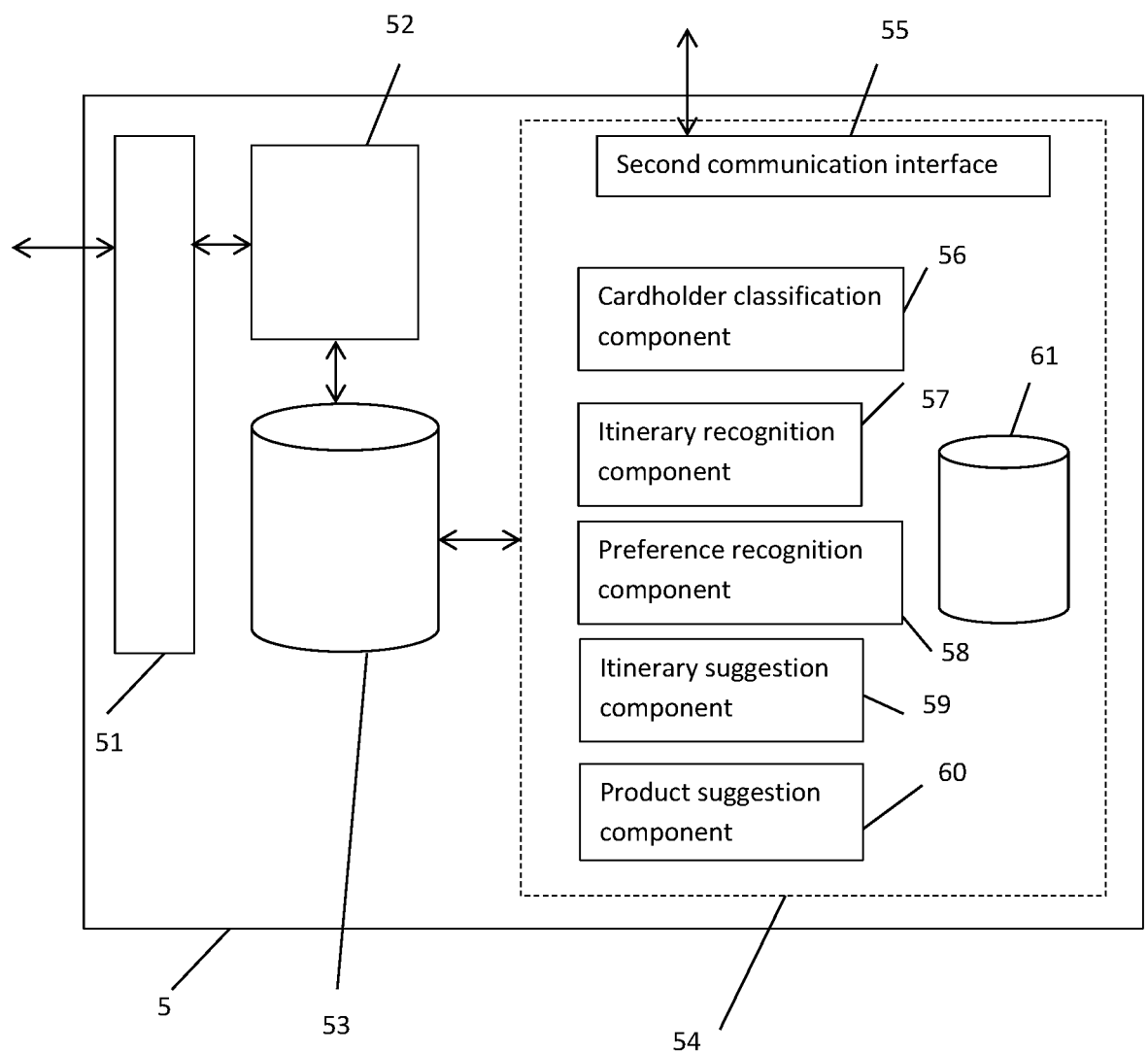
FIG. 2 shows schematically processing components of one unit of a computer server which is a part of the computerized network of FIG. 1.

Referring to FIG. 2 the logical structure of the payment network server 5 is shown. As in a conventional system, the payment network server has a first communication interface 51 for communicating with the acquirer bank server 15 and issuer bank server 9. Relay component 52 receives messages over the communication interface 51 from the acquirer bank server 15 and issuer bank server 9, and redirects them over the communication interface 51 to the issuer bank server 9 and acquirer bank server 15 respectively (optionally adding or removing data from them).

The server 5 stores a record of the payment transactions relating to the messages in the database 53. The transaction records are transaction data which comprise a plurality of fields, including acquirer identifier/card accepter identifier (the combination of which uniquely defines the merchant); merchant category code (also known as card acceptor business code), that is, an indication of the type of business the merchant is involved in (for example, a gas station); cardholder base currency (i.e., U.S. Dollars, Euros, Yen, etc.); the transaction environment or method being used to conduct the transaction; product specific data such as SKU line item data; the transaction type; card identifier (e.g., card number); time and date; location (full address and/or GPS data); transaction amount (also referred to herein as ticket size); terminal identifier (e.g., merchant terminal identifier or ATM identifier); issuer country code; and response code (also referred to herein as authorization code). Other fields may be present in each transaction record.

The database 53 may store further information about the cardholders, such as demographic information (e.g. age, gender, ...) or location information specifying one or more locations associated with the cardholders, such as registered address(es) of the cardholders. The units 51, 52, 53 are present in a known payment network server and will not be described further.

In contrast to a known payment network server, the payment network server 5 further includes a unit 54 for providing travel recommendations to users. The unit 54 comprises an second communication interface 55 for managing communication with the communication network 7.

In one form, the communication interface 55 generates a graphical user interface (GUI) which the cardholder can access using a standard browser application provided on the communication devices 1, 3.

In another form, a dedicated software application (e.g. provided by the company which operates the payment network) may be installed on the communication devices 1, 3. The second communication interface 55 is operative to receive data input to the application by the cardholder, such as into certain fields of a GUI generated by the application. The communication interface 55 is further operative to transmit data to the application, e.g. to populate fields of the GUI.

The unit 54 further includes a cardholder classification component 56 to classify cardholders based on their payment transactions, as recorded in the database 53. Optionally, the cardholder classification component 56 may use further data about the cardholders available in the database 53, such as the demographic information or location information.

The unit 54 further includes an itinerary recognition component 57 to deduce, from payment transactions of a cardholder, that the cardholder has had a vacation, and extract properties of the vacation.

The unit 54 further includes a preference recognition component 58, for identifying a cardholder's vacation preferences (e.g. in terms of weather and/or type of destination) based on earlier vacations the cardholder has taken.

The unit 54 further includes an itinerary suggestion component 59 for suggesting itineraries to the user. As described below, the itinerary suggestion component 59 extracts statistically significant features of the vacations of multiple cardholders, and thereby suggest a vacation itinerary representative of the statistically significant features.

The unit 54 further includes a product suggestion component 60 for recommending products to cardholders.

The output of the itinerary suggestion component 59 and the product suggestion component 60 is display data, which is transmitted over the interface 55 to the user's communication device 1, 3, for display on the GUI generated by the browser or software application.

The unit 54 further includes a destination database 61 of destination specific information ("destination data") describing a plurality of travel destinations. The destination data includes, but is not limited to, data characterizing expected weather at the destination at each time of year, data characterizing merchant(s) offering products in the destination and/or individual products the merchant(s) offer, and data specifying events at the destination (e.g. the dates on which performance events occur).

Figure 3:
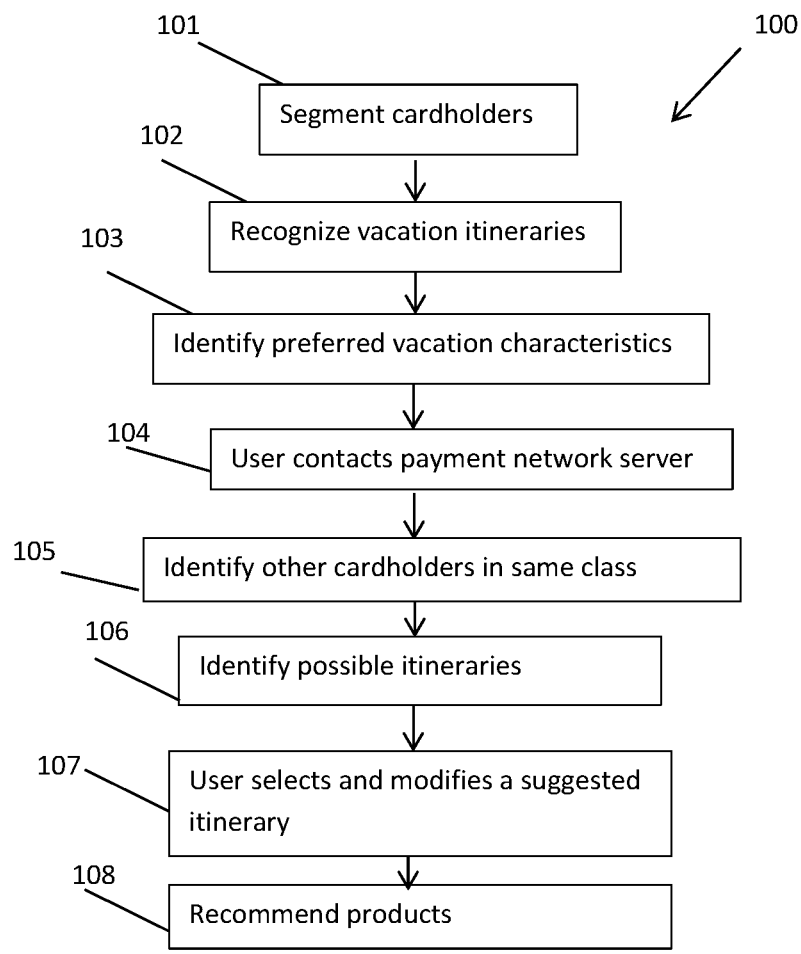
FIG. 3 shows processing steps in the method which is an embodiment of the invention.

Turning to FIG. 3, the process flow of a method 100 according to the invention is shown. The method 100 comprises steps 101-103 which may be performed offline (i.e. when no specific cardholder is interacting with the server 5), and steps 104-108 which are performed while a specific cardholder (the "user") is interacting with the system.

In step 101, the cardholders are "segmented" (classified) by the cardholder classification component 56 into a plurality of classes based on the transactional data in the database 53. For example, there may be three classes (low, medium or high spender), and the card holders may be classified based on their spending behavior in the travel industry, vehicle rentals and/or on their overall spend on cards.

An example of how this may be done is the following. For each cardholder, the cardholder classification component 56 categorizes the spending on the cardholder(s) cards as recorded in the database 53 into two parts: a) Normal Spend b) Vacation and Vehicle Rental Spend. Subsequently the cardholder classification component 56 finds the average spending by each cardholder on vacations (including vehicle rental spend) and average normal spending per month (on the basis of day to day transactions). Based on the average spending of each cardholder the cardholder classification component 56 will then categorize them into 3 segments: a) High Spenders b) Medium Spenders c) Low spenders. For example, the High spenders will include those who travel in business class, stay in expensive hotels, have expensive food preferences, or simply spend more than a predefined threshold amount. Possible results are shown in Table 1.

TABLE 1

| Cardholder | Segment | Vacation Destination |
| --- | --- | --- |
| C, P, Q | High | Europe, USA, Canada |
| A, R, S, Y, Z | Medium | Brazil, South Africa, Argentina |
| B, T, U, V | Low | India, China |

Note that in step 101 (and in the subsequent steps of the method described below), the unit 54 may take one of more measures to exclude from consideration in step 101 any payment transactions in the database 53 relating to business travel (that is, the method 100 attempts to use only payment transactions relating to vacation travel). This because business travel may happen at any time according to the needs of the cardholder's business, can be to any place, in any weather, at any distance and be independent of a cardholder's preferences. Therefore, neglecting business travel improves the accuracy of the method. One way of attempting to neglect payment transactions relating to business spending is to neglect spending on payment cards which (e.g. according to the database 53) are so-called corporate cards or commercial cards, which are cards issued to a cardholder who is a shareholder of a business.

In step 102, the itinerary recognition component 57 recognizes vacation itineraries in the spending of each cardholder. The itinerary recognition component 57 does this by identifying payment transactions recorded in the database 57 for each cardholder associated with travel (e.g. flight tickets or vehicle rental), and/or purchases at successive destinations during a predefined time period (e.g. a month).

For example, the itinerary recognition component 57 may identity from the payment transactions in the database 57 that cardholder A, who was identified as being in the high spender category in step 101, purchased air tickets, and the landing point was Barcelona, Spain. The itinerary recognition component may further determine that cardholder A rented a vehicle from Barcelona, and identify that cardholder A made the purchases shown in Table 2.

TABLE 2

| City | Destination | Nights Spent in City | Vehicle Rental Details | Activities (Identified based on merchants in MasterCard data) | Expenditure | Stop points between Journey (for fuel, food, etc.) |
|---|---|---|---|---|---|---|
| 1 | Barcelona, Spain | 3 | Sports Car, Starting Odometer Reading, Checkout Date | Water Sports, Monuments/Stadium, City Tour, Stay, Food, Fuel | $3,000 | NA |
| 2 | Toulouse, France | 1 | NA | Travel, Food, Fuel, Stay, Museum | $1,200 | Girona, Perpignan, Carcassonne |
| 3 | Bordeaux, France | 2 | NA | Travel, Food, Fuel, Stay, Museum, Church, Theatre | $1,500 | Castelsarrasin, Tonneins, Cadillac |
| 4 | Nantes, France | 1 | NA | Travel, Food, Fuel, Stay, Museum, Stadium, Monuments | $1,000 | Saintes, La Creche, Sainte-Hermine |
| 5 | Paris, France | 3 | NA | Travel, Food, Fuel, Stay, Museum, Monuments, Church, Shopping | $2,500 | Angers, Le Mans, Chartres |
| 6 | Brussels, Belgium | 2 | NA | Travel, Food, Fuel, Stay, Museum, Monuments, Church, Shopping | $1,500 | Compiegne, Valenciennes |
| 7 | Amsterdam, Netherlands | 2 | Ending Odometer Reading, Return Date | Travel, Food, Fuel, Stay, Museum, Monuments, Shopping | $2,000 | Antwerp, Breda, Utrecht |
|  | Total | 14 | 2,200 KMs, 13 days | NA | $12,700 | NA |

From this, the itinerary recognition component 53 infers that the cardholder has made a journey through the locations listed in the second column of Table 2. It further identifies the merchants the cardholder used in each location.

In step 103, for each cardholder the preference recognition component 58 identifies each cardholder's preferred vacation characteristics. Examples of possible characteristics include, but are not limited to merchant preferences for food, lodging, vehicle rental, etc., vacation budget, kind of destination (e.g. beach, mountain, architectural, ancient history, etc.), distance from a habitual location for the cardholder, and whether any events are scheduled at the destination (e.g. opera festivals), and optionally vacation weather preferences. The preference recognition component 58 uses the destination data stored in the destination database 61.

Table 3 gives examples of the results of this analysis for cardholders A to E. The table shows for each of the cardholders one or more itineraries identified in step 102, and for each itinerary the corresponding destination and dates (also identified in step 102). The spending during the itinerary is shown in column 6, and columns 5 and 7 respectively show a type of vacation (identified in step 103) and the weather during the vacation (also identified in step 103).

TABLE 3

| Cardholder | Origin | Vacation Destination | Travel Month and Vacation Duration | Vacation Characteristics | Budget | Weather of destination |
|---|---|---|---|---|---|---|
| A | Washington, USA | Barcelona, Spain | July'15 (10 days) | Road trip, beaches, water Sports, monuments | $3,800 | Pleasant |
| A | Washington, USA | Nice, France | July'14 (5 days) | Beaches, Water Sports | $2,500 | Pleasant |
| A | Washington, USA | Barcelona, Spain | July'15 (7 days) | Beaches, Water Sports | $2,700 | Pleasant |
| A | Washington, USA | Greenland | Jan'15 (3 days) | Snow, Mountains | $3,000 | Very Cold/Snowy |
| A | Washington, USA | Switzerland | Jan'14 (6 days) | Snow, Mountains | $5,000 | Very Cold/Snowy |
| B | Chicago, USA | New York, USA | Oct'14 (3 days) | Leisure | $1,900 | Fall |
| B | Chicago, USA | Boston, USA | Oct'15 (2 days) | Leisure | $1,800 | Fall |
| C | England | Las Vegas | Oct'15 (4 days) | Casino | $15,000 | Fall |
| C | England | Monaco | Sep'15 (5 days) | Casino | $20,000 | Fall |
| D | India | Europe | July'15 (12 days) | Road Trip | $4,000 | Sunny |

TABLE 3-continued

| Cardholder | Origin | Vacation Destination | Travel Month and Vacation Duration | Vacation Characteristics | Budget | Weather of destination |
|---|---|---|---|---|---|---|
| E | India | Goa | Dec'14 (4 days) | Sunburn | $500 | Sunny |
| E | India | Brussels, Belgium | June'15 (5 days) | Tomorrowland | $2,500 | Sunny |

Here "Sunburn" and "Tomorrowland" are popular music events which, according to the database 61 respectively occurred during cardholder E's two vacations, so that the preference recognition component 58 may infer that cardholder E attended them with a probability value. The preference recognition component 58 infers this if the probability value is more than a certain threshold. The preference recognition component 58 may determine whether the database 53 includes a payment to a ticket vendor for these events, and if so calculate a higher value for the probability value.

The preference recognition component 58 then uses the data in Table 3 to derive for each cardholder corresponding candidate destinations (e.g. five destinations) which that cardholder might enjoy visiting. For example, cardholder 'C' is interested in gambling and he travels long distances to do so, so for him the preference recognition component 58 may suggest other famous casinos around the world. Similarly cardholder E have interest in musical events and hence the preference recognition component 58 may list destinations where such events occur. The candidate destinations for cardholders A to C may be as shown in Table 4:

TABLE 4

| Cardholder | Suggested Places |
|---|---|
| A | Finland, Caribbean Islands, Austria |
| B | Orlando, Miami |
| C | Macau |

The preference recognition component 58 may also use the data in Table 3 to derive estimated time-of-year preferences and weather preferences for each of the cardholders. The result may be as shown in Table 5.

TABLE 5

| Cardholder | Month | Weather |
|---|---|---|
| A | June/July | Pleasant |
| A | January | Very Cold/Snowy |
| B | October | Fall |
| C | September-November | Cold/Mild Cold |
| D | July | Sunny |
| E | June/December | Sunny |

Note that cardholder A has been estimated to like two sorts of vacations. Ones in June/July in pleasant weather, and ones in January in very cold/snowy weather.

The preference recognition component 58 may combine the results of Tables 4 and 5 as shown in Table 6, to form a list for each candidates one or more suggestions of places and times of year to visit, with the associated expected weather.

TABLE 6

| Cardholder | Suggested Places | Time | Weather |
|---|---|---|---|
| A | Finland | January | Very Cold/Snowy |
| A | Austria | January | Very Cold/Snowy |
| A | Caribbean Islands | June/July | Pleasant |
| B | Orlando | September/October | Fall |
| B | Miami | September/October | Fall |
| C | Macau | November | Cold |

Note that step 103 may include obtaining data about product purchases made by the cardholder in the travel destinations. For example, step 103 may include identifying what type of vehicle the cardholder hired for the journey.

Furthermore, step 103 may include obtaining data characterizing the travel during the road trip, such as the estimated travel distance and/or the gasoline cost.

In step 104, a certain one of the card holders—the "user", who is the card holder associated with the communication devices 1, 3—contacts the server 5 using a communication device 1, 3, the communication network 7 and the interface 55. The user does this using a browser or a software application on the communication device 1, 3. The user and server 5 perform an identification procedure in which the user is identified (e.g. by entering a card number of his or her payment card) and an optional identify authentication procedure.

If this is successful, the user is presented with a GUI on a screen of the communication device 1, 3. The user optionally uses the GUI to enter constraints on the vacation the user wishes to take (e.g. a date range, a type of trip, a geographic region where the vacation should take place), etc. This data is received by the unit 54 via the communication network 7 and the second communication interface 55.

In step 105, the method 100 identifies the other card holders in the same class as the user: that is, card holders with similar characteristics.

In step 106, the itinerary suggestion component 59 identifies one of more new routes for possible road trips the user might take. It transmits these recommendations to the second communication interface 55, which forwards them as display data to the communication device(s) 1,3 which display them to the user on a screen as itinerary suggestions.

The suggestion(s) made by the itinerary suggestion component 59 may be made by taking the user's vacation preferences as identified in step 103, and using them to filter itineraries for other cardholders identified in step 102 who, according to the analysis of step 101, are in the same cardholder segment as the user. Thus, itineraries are found which are compatible with the cardholder's tastes (e.g. with regard to the travel time, or season, or weather etc.) and which were in fact journeys previously taken by other cardholders in the same class. The itinerary(ies) will also be compatible with any constraints the user specified in step 104 (for example, if the user specified that he or she was searching for an itinerary for the coming January, the itinerary suggestion component may only search for itineraries in the Januarys of previous years). It may also take into account the date on which steps 104-106 are performed, e.g. to suggest itineraries during the coming months.

For example, suppose that the user is cardholder A, and performs step 104 in October. This suggests that the cardholder is looking for suggestions for a road trip in the few months after October. Using Table 6, the itinerary suggestion component 59 may infer that a trip in January is desired. In step 104, the user may have specified that the vacation is in northern Europe. Thus, based on Table 4, the itinerary suggestion component 59 will search for itineraries of vacations by other high spend customers (i.e. cardholder A's segment) in Finland during January.

If only a small number of such itineraries are found in the search (e.g. just one) the itinerary suggestion component may make respective suggestions to the user based on those itineraries.

Alternatively, if there are a plurality of search results, the results are analyzed statistically to identify statistically significant correlations, and the itinerary suggestion component 60 recommends an itinerary based on the corrections. For example, if the user is cardholder A, and if the itinerary suggestion component 60 determines that high spend customers (i.e. cardholder A's class), when making multi-destination trips to Northern Europe, visit Helsinki in 50% of cases, and stay there for on average 2 nights, then the itinerary suggestion component will typically suggest an itinerary including 2 nights in Helsinki, Finland.

The itinerary suggestion(s) may include a suggested number of dates to spend in each destination, e.g. in line with that derived in step 103. They may be include a suggestion of specific dates to spend in each destinations (e.g. so that the user is a given destination when an event listed in the database 61 is scheduled to occur), and the display data sent by the unit 54 to the user's communication device may include data describing these events.

In optional step 107, the user selects one of the itineraries, and this selection is transmitted via the second communication interface 55 to the product suggestion component 60. Optionally, this step may include the user making a number of modifications to the suggested itinerary, e.g. to add additional destinations near the suggested destinations, or to remove destinations in which the user has no interest. The user may also modify the suggested number of days spent in each of the destinations.

In step 108, the product suggestion component 60 transmits to the second communication interface 55 product suggestion data including merchant and/or product suggestions (e.g. flights) related to the itinerary suggestion(s) proposed in step 106 (or, if step 107 was carried out, the itinerary accepted by the user, with any modifications). Conveniently, the product suggestion data may include links to websites operated by the merchants.

The product suggestion component 60 may make recommendations based on the cardholder's previous travel data, as identified in step 103. For example, for a cardholder in the low spender segment, the product suggestion component 60 may suggest cheaper flights to places nearby Barcelona, cheaper stay using the Airbnb.com website, etc. In this way, the product suggestion component 60 helps make the user's trip economical. If the suggested itinerary includes a suggestion to attend an event in the destination, the product suggestion component 60 may suggest a provider of tickets to the event.

Note that in variations of the embodiment the steps of method 100 may be carried out in a different order. For example, the system may only carry out steps 101 to 103 for a small number of cardholders. If the user who contacts the system in step 104 is not one of those cardholders then steps 101 to 103 may be carried out in respect of that user following step 104.

Figure 4:
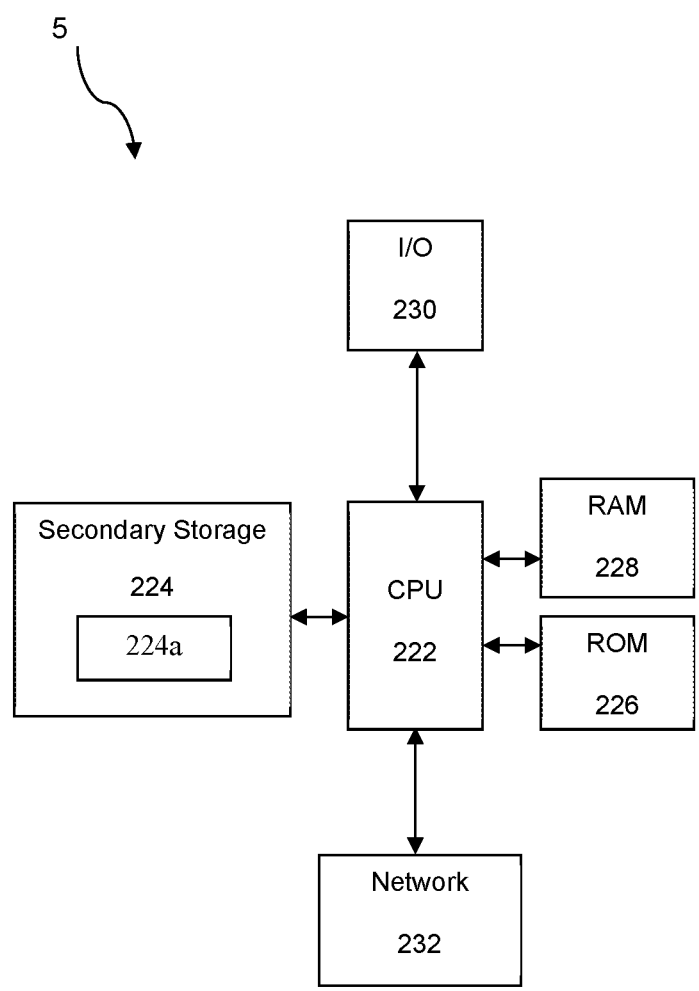
FIG. 4 shows the physical structure of the computer server of FIG. 2.

FIG. 4 is a block diagram showing a technical architecture of the payment network server 5. The merchant server 11 may also have this technical architecture.

The technical architecture includes a processor 222 (which may be referred to as a central processor unit or CPU) that is in communication with memory devices including secondary storage 224 (such as disk drives), read only memory (ROM) 226, random access memory (RAM) 228. The processor 222 may be implemented as one or more CPU chips. The technical architecture may further comprise input/output (I/O) devices 230, and network connectivity devices 232.

The secondary storage 224 is typically comprised of one or more disk drives or tape drives and is used for non-volatile storage of data and as an over-flow data storage device if RAM 228 is not large enough to hold all working data. Secondary storage 224 may be used to store programs which are loaded into RAM 228 when such programs are selected for execution.

In this embodiment, the secondary storage 224 has an order processing component 224a comprising non-transitory instructions operative by the processor 222 to perform various operations of the method of the present disclosure. The ROM 226 is used to store instructions and perhaps data which are read during program execution. The secondary storage 224, the RAM 228, and/or the ROM 226 may be referred to in some contexts as computer readable storage media and/or non-transitory computer readable media.

I/O devices 230 may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 232 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 232 may enable the processor 222 to communicate with the Internet or one or more intranets. With such a network connection, it is contemplated that the processor 222 might receive information from the network, or might output information to the network in the course of performing the above-described method operations. Such information, which is often represented as a sequence of instructions to be executed using processor 222, may be received from and outputted to the network, for example, in the form of a computer data signal embodied in a carrier wave.

The processor 222 executes instructions, codes, computer programs, scripts which it accesses from hard disk, floppy disk, optical disk (these various disk based systems may all be considered secondary storage 224), flash drive, ROM 226, RAM 228, or the network connectivity devices 232. While only one processor 222 is shown, multiple processors may be present. Thus, while instructions may be discussed as executed by a processor, the instructions may be executed simultaneously, serially, or otherwise executed by one or multiple processors.

Although the technical architecture is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 220 to provide the functionality of a number of servers that is not directly bound to the number of computers in the technical architecture 220. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

It is understood that by programming and/or loading executable instructions onto the technical architecture, at least one of the CPU 222, the RAM 228, and the ROM 226 are changed, transforming the technical architecture in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Figure 5:
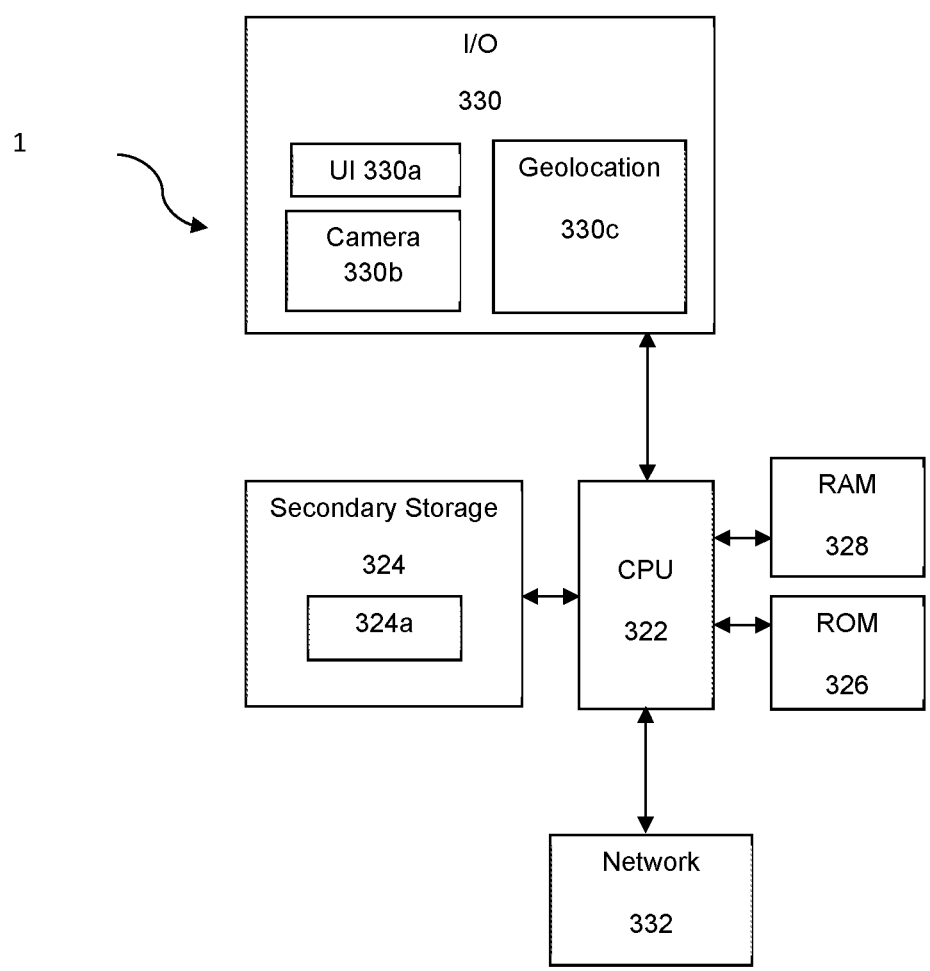
FIG. 5 shows the structure of a mobile device which is a component of the computerized network of FIG. 1.

FIG. 5 is a block diagram showing a technical architecture of the communication device 1. It is envisaged that in embodiments, the communication device will be a smartphone or tablet device.

The technical architecture includes a processor 322 (which may be referred to as a central processor unit or CPU) that is in communication with memory devices including secondary storage 324 (such as disk drives or memory cards), read only memory (ROM) 326, random access memory (RAM) 328. The processor 322 may be implemented as one or more CPU chips. The technical architecture further comprises input/output (I/O) devices 330, and network connectivity devices 332.

The I/O devices comprise a user interface (UI) 330a, a camera 330b and a geolocation module 330c. The UI 330a may comprise a touch screen, keyboard, keypad or other known input device. The camera 330b allows a user to capture images and save the captured images in electronic form. The geolocation module 330c is operable to determine the geolocation of the communication device using signals from, for example global positioning system (GPS) satellites.

The secondary storage 324 is typically comprised of a memory card or other storage device and is used for non-volatile storage of data and as an over-flow data storage device if RAM 328 is not large enough to hold all working data. Secondary storage 324 may be used to store programs which are loaded into RAM 328 when such programs are selected for execution.

In this embodiment, the secondary storage 324 has an order generation component 324a, comprising non-transitory instructions operative by the processor 322 to perform various operations of the method of the present disclosure. The ROM 326 is used to store instructions and perhaps data which are read during program execution. The secondary storage 324, the RAM 328, and/or the ROM 326 may be referred to in some contexts as computer readable storage media and/or non-transitory computer readable media.

The network connectivity devices 332 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 332 may enable the processor 322 to communicate with the Internet or one or more intranets. With such a network connection, it is contemplated that the processor 322 might receive information from the network, or might output information to the network in the course of performing the above-described method operations. Such information, which is often represented as a sequence of instructions to be executed using processor 322, may be received from and outputted to the network, for example, in the form of a computer data signal embodied in a carrier wave.

The processor 322 executes instructions, codes, computer programs, scripts which it accesses from hard disk, floppy disk, optical disk (these various disk based systems may all be considered secondary storage 324), flash drive, ROM 326, RAM 328, or the network connectivity devices 332. While only one processor 322 is shown, multiple processors may be present. Thus, while instructions may be discussed as executed by a processor, the instructions may be executed simultaneously, serially, or otherwise executed by one or multiple processors.

The communication device 3 has much may have much the same structure as the communication device 1 but optionally omitting certain elements such as the geolocation device 330c.

Whilst the foregoing description has described exemplary embodiments, it will be understood by those skilled in the art that many variations of the embodiment can be made within the scope and spirit of the present invention.

The invention claimed is:

1. A computer-implemented method for proposing at least one multi-destination travel itinerary to a user who is a payment card holder, the method comprising:
   segmenting a plurality of reference payment card holders and the user into a plurality of spending-level classes based on transaction data related to payment transactions of the reference payment card holders and the user;
   identifying, using the transaction data of the reference payment card holders, a first set of multi-destination journeys made by corresponding ones of the reference payment card holders;
   identifying multiple travel destinations in the first set of multi-destination journeys based on the spending-level class corresponding to the user;

using the identified travel destinations to derive the at least one travel itinerary; and generating display data encoding the derived at least one travel itinerary.

2. A method according to claim 1 further comprising:

using transaction data describing payment transactions by the user to identify a second set of multi-destination journeys made by the user, and from the second set of multi-destination journeys, deriving user travel preferences;

wherein, the first set of multi-destination journeys being filtered based on the user travel preferences to eliminate multi-destination journeys which are not consistent with the user travel preferences, whereby the at least one travel itinerary is consistent with the user travel preferences.

3. A method according to claim 1 further comprising:

receiving from the user one or more user-specified preferences;

wherein, the first set of multi-destination journeys being filtered based on the user-specified preferences to eliminate multi-destination journeys which are not consistent with the user-supplied preferences, whereby the at least one travel itinerary is consistent with the user-supplied preferences.

4. A method according to claim 1 in which the identification of the first set of multi-destination journeys uses addendum data in the transaction data specifying products which were purchased in corresponding payment transactions.

5. A method according to claim 1 in which the identification of the first set of multi-destination journeys comprises identifying successive payments made during a certain period in different respective destinations.

6. A method according to claim 1 in which the step of using the identified travel destinations to derive the at least one travel itinerary comprises performing a pattern recognition algorithm on the first set of multi-destination journeys, to identify destinations which occur with relatively high statistical significance, the at least one travel itinerary being composed of destinations identified as occurring with relatively high statistical significance.

7. A method according to claim 1, which the step of deriving the at least one travel itinerary further includes generating a date suggestion for when the user performs the journey specified by the derived at least one itinerary.

8. A method according to claim 1 in which the step of deriving the at least one travel itinerary uses a destination database of destination data characterizing the travel destinations at corresponding times.

9. A method according to claim 8 in which the destination data comprises data characterizing expected weather conditions at the travel destinations at corresponding times of the year.

10. A method according to claim 8 in which the destination data comprises data characterizing scheduled events at the travel destinations.

11. A method according to claim 1 further comprising:

(i) using the at least one travel itinerary to generate product suggestion data, the product suggestion data comprising at least one of:

data characterizing a merchant and data characterizing a product supplied by a merchant; and (ii) generating display data encoding the product suggestion data.

12. A method according to claim 11 in which the product suggestion data is derived using transaction data relating to payments made at the destinations of the at least one itinerary by the reference payment card holders.

13. A method according to claim 11 in which the merchants comprise any one or more of hotel providers, travel ticket providers or vehicle hire providers.

14. A method according to claim 1 further comprising transmitting the display data to a communication device associated with the user and comprising a screen, whereby the communication device displays the display data to the user.

15. A computer system for proposing at least one multi-destination travel itinerary to a user who is a payment card holder, the computer system comprising:

a database of transaction data describing payment transactions made by a plurality of reference payment card holders;

a card holder classification component operative to use the transaction data to segment the reference payment card holders and the user into a corresponding one of a plurality of spending-level classes;

an itinerary recognition component operative to use the transaction data to identify multi-destination journeys made by the reference payment card holders based on the spending-level class corresponding to the user; and an itinerary suggestion component for using travel destinations included in at least some of the identified multi-destination journeys to derive the at least one travel itinerary, and generate display data encoding the derived at least one travel itinerary.

16. A computer system according to claim 15 further comprising a preference recognition component operative to use identified multi-destination journeys made by the user, to derive user travel preferences, the itinerary suggestion component being arranged to filter the identified multi-destination journeys based on the derived user travel preferences.

17. A computer system according to claim 15 further comprising a communication interface for receiving one or more user-specified preferences;

the itinerary suggestion component being arranged to filter the identified multi-destination journeys of the reference payment card holders based on the user-supplied preferences.

18. A computer system according to claim 15 in which the itinerary suggestion component comprises a pattern recognition module operative to identify within a set of identified journeys, travel destinations which occur with relatively high statistical significance.

19. A computer system according to according to claim 15 further comprising a destination database storing destination data characterizing the travel destinations at corresponding times.

20. A computer system according to claim 19 in which the destination data comprises data characterizing expected weather conditions at the travel destinations at corresponding times of the year.

21. A computer system according to claim 19 in which the destination data comprises data characterizing scheduled events at the travel destinations.

22. A computer system according to claim 15 further comprising a product suggestion component operative to use the at least one travel itinerary to generate product suggestion data, the product suggestion data comprising at least one of:

data characterizing a merchant and data characterizing a product supplied by a merchant.

23. A computerized network comprising:
a computer system according to claim 15; and
a communication device associated with the user, and operative to communicate with the computer system.

\* \* \* \* \*